United States Patent
Huber et al.

(10) Patent No.: US 9,978,286 B2
(45) Date of Patent: May 22, 2018

(54) METHOD FOR AVOIDANCE OF ONE OR MORE OBSTACLES BY AN AIRCRAFT, AND RELATED COMPUTER PROGRAM PRODUCT, ELECTRONIC SYSTEM AND AIRCRAFT

(71) Applicant: THALES, Courbevoie (FR)

(72) Inventors: Daniel Huber, Toulouse (FR); François Colonna, Toulouse (FR); Xavier Rueff, Toulouse (FR)

(73) Assignee: THALES, Courbevoie (FR)

( * ) Notice: Subject to any disclaimer, the term of this patent is extended or adjusted under 35 U.S.C. 154(b) by 0 days. days.

(21) Appl. No.: 15/007,038

(22) Filed: Jan. 26, 2016

(65) Prior Publication Data
US 2016/0217697 A1    Jul. 28, 2016

(30) Foreign Application Priority Data
Jan. 26, 2015   (FR) ..................... 15 00144

(51) Int. Cl.
*G01C 23/00*   (2006.01)
*G08G 5/04*    (2006.01)
(Continued)

(52) U.S. Cl.
CPC .......... *G08G 5/045* (2013.01); *G05D 1/0061* (2013.01); *G05D 1/101* (2013.01); *G08G 5/0069* (2013.01); *G08G 5/0078* (2013.01)

(58) Field of Classification Search
CPC combination set(s) only.
See application file for complete search history.

(56) References Cited

U.S. PATENT DOCUMENTS 3,903,501 A * 9/1975 Greenlee ............... H05B 41/34
                                                          327/402
5,892,462 A * 4/1999 Tran ...................... G01C 5/005
                                                          340/961
(Continued)

FOREIGN PATENT DOCUMENTS

DE  10 2010 031780 A1    1/2012
EP       1859428 B1       1/2010
(Continued)

OTHER PUBLICATIONS

English Translation of French Patent Publication FR 2938683 (Airbus), May 21, 2010.*
(Continued)

*Primary Examiner* — Hussein Elchanti
(74) *Attorney, Agent, or Firm* — Knobbe Martens Olson & Bear LLP

(57) ABSTRACT

A system and method for the avoidance of one or more obstacles by an aircraft, and a related computer program product, electronic system and aircraft are disclosed. In one aspect, the method includes a) generating an alert by a warning system on detection of an obstacle and b) if no manual avoidance maneuver is detected for a time period longer than a first determined time and if the alert is maintained during this first time period, automatically activating an automatic avoidance guide mode to determine an obstacle-avoidance guidance rule. The method further including c) if an autopilot device of the aircraft is coupled to the automatic avoidance guide mode, transmitting to the autopilot device the avoidance guidance rule determined in step b) for automatic performing of a maneuver to avoid the obstacle.

15 Claims, 2 Drawing Sheets

(51) Int. Cl.
*G05D 1/00* (2006.01)
*G05D 1/10* (2006.01)
*G08G 5/00* (2006.01)

(56) References Cited

U.S. PATENT DOCUMENTS

| | | | |
|---|---|---|---|
| 6,675,075 B1 * | 1/2004 | Engelsberg | G02B 27/01 345/4 |
| 2007/0032940 A1 * | 2/2007 | Villiers | G08G 5/0013 701/120 |
| 2007/0080848 A1 * | 4/2007 | Stone | G01S 7/04 342/30 |

FOREIGN PATENT DOCUMENTS

| | | |
|---|---|---|
| FR | 2876483 A1 | 4/2006 |
| FR | 2938683 A1 | 5/2010 |

OTHER PUBLICATIONS

Search Report dated Dec. 23, 2015 for French Patent Application No. 1500144 filed on Jan. 26, 2015.

* cited by examiner

METHOD FOR AVOIDANCE OF ONE OR MORE OBSTACLES BY AN AIRCRAFT, AND RELATED COMPUTER PROGRAM PRODUCT, ELECTRONIC SYSTEM AND AIRCRAFT

CROSS-REFERENCE TO RELATED APPLICATIONS

This patent application claims the benefit under 35 U.S.C. § 119 of French Application No. FR 15 00144 filed on Jan. 26, 2015 which is hereby incorporated by reference in its entirety.

BACKGROUND

Technological Field

The described technology is directed towards a method and electronic system for the avoidance of one or more obstacles by an aircraft, e.g., a rotary-wing aircraft. It finds particular application in the field of flight management and aircraft guidance systems when a risk of collision with terrain obstacles, without loss of control, is identified by a monitoring system.

Description of the Related Technology

Multiple guide systems are known for proper flight functioning to reduce risks and decrease workload for the crew.

For enhanced safety, systems are used capable of anticipating risks of collision and of generating warnings. For example, mention can be made of systems such as Terrain Awareness and Warning System (TAWS), Helicopter Terrain Awareness and Warning System (HTAWS) and Ground Proximity Warning System (GPWS) or Enhanced Ground Proximity Warning System (eGPWS), which are able to provide warnings to crews translating the imminence of a collision with terrain obstacles.

The use of these systems generally requires the disconnection of automatic pilot systems and manual piloting of the aircraft by the crew to carry out the avoidance maneuver, resulting in increased workload for the crew during the maneuver.

In addition, these systems necessitate specific crew training. Despite this training, manual implementation of the avoidance maneuver by the crew may prove to be inadequate, e.g., over- or under-dimensioned. Perception itself of the actual situation by the crew may be difficult and the avoidance maneuver delayed, inappropriate or even lacking.

Human error may therefore subsist when understanding the situation and performing the maneuver, leading to reduced safety margins and in some cases to collisions.

From document EP 1 859 428 B1 a method and system are known for avoidance of an obstacle by a passenger aircraft, which, when the warning system detects a risk of collision and gives an alarm, immediately performs an automatic avoidance maneuver.

This solution particularly has the disadvantage of leaving the crew outside the decision loop. Therefore, in addition to the difficulty in apprehending the situation related to a collision risk, there is also the surprise of a non-requested automatic maneuver. This is particularly the case with rotary-wing aircraft that frequently fly close to elevated terrain and for which sudden, fully automatic takeover of commands is unsuitable.

SUMMARY OF CERTAIN INVENTIVE ASPECTS

The described technology therefore sets out to solve the aforementioned problems in particular by proposing a method and system for obstacle avoidance providing aircraft crew with assisted piloting of the avoidance maneuver, without systematically switching over to a mode in which the avoidance maneuver is automatically carried out.

One inventive aspect is a method for the avoidance of one or more obstacles by an aircraft, e.g., a rotary-wing aircraft, comprising a warning system capable of generating alerts as a function in particular of the proximity of one or more obstacles, and an electronic avoidance system, the method being implemented by the electronic avoidance system, the method comprising a step a) to generate an alert by the warning system on detection of an obstacle.

Additionally the method comprises the following steps:

b) if no manual avoidance maneuver is detected for a time longer than a first determined time effective from issue of the alert by the warning system and if the alert is maintained during this first period of time, automatic activation of an automatic avoidance guide mode to determine a guidance rule for avoidance of the obstacle, the determination of the guidance rule comprising the determination of at least one speed and/or heading set-point and the computing of the avoidance guidance rule as a function of the determined set-point(s); and c) if an autopilot device of the aircraft is coupled to the automatic avoidance guide mode, transmission to the autopilot device of the avoidance guidance rule determined at step b) for automatic implementation of an obstacle avoidance maneuver by action on one and/or the other of two primary control members of the aircraft to cause the aircraft to reach the set-point(s), the warning system being capable of generating alerts of at least a first and second type, and step b) only being implemented in the event that the alert generated by the warning system is an alert of second type.

According to some embodiments, the method further comprises one or more of the following characteristics taken alone or in any possible technical combination:

if the autopilot device is not coupled to the automatic avoidance guide mode, display of the avoidance guidance rule determined at step b) on a display device of the aircraft visible to the crew; to provide assistance to the crew in performing a manual avoidance maneuver by action on one and/or the other of two primary control members of the aircraft causing the aircraft to reach the set-point(s);

step b) is only implemented in the event that the alert of second type generated by the warning system has been preceded by generation of an alert of the first type by the warning system;

activation of the automatic avoidance guide mode of step b) can be performed manually by the crew;

the avoidance guidance rule, for at least one of the set-points; comprises a convergence rule according to which the current value must converge towards the corresponding set-point;

the determining of the guidance rule comprises measurement of the current speed value(s) of the aircraft on which it is sought to act, and determination of the set-point comprises the comparison of this or these current values with one or more corresponding reference values and determining of the set-point(s) as a function of this comparison;

one of the determined set-points is an air speed or ground speed set-point comprising a longitudinal component perpendicular to a vertical axis, and determination comprises comparison of the current air or ground speed of the aircraft with the best rate of climb, and the selection of the current air or ground speed as air or ground speed set-point if the current air or ground speed is lower than the best rate of climb, and if not selection of the best rate of climb;

one of the determined set-points is a vertical speed set-point comprising a vertical component, and determination comprises comparing the current vertical speed of the aircraft with a reference vertical speed value as a function of the type of warning, and selecting the reference vertical speed as vertical speed set-point if the current vertical speed is lower than the reference vertical speed, if not selection of the current vertical speed;

determination comprises verification of the compatibility of the determined vertical speed set-point with a minimum flight path angle as a function of the aircraft in particular, and the computing of a new vertical speed set-point compatible with the minimum flight path angle if the determined vertical speed set-point is not compatible with this minimum flight path angle;

one of the determined set-points is a heading set-point, the determination of the guidance rule comprises measurement of the current heading value of the aircraft on which it is sought to act, and determination of the set-point comprises verification of the compatibility of the current heading value with a heading constraint, and the computing of a heading set-point compatible with the heading constraint if the current value is not compatible with this heading constraint, otherwise selection of the current value as heading set-point.

Another aspect is a computer program product comprising software instructions which, when executed by a computer, implement the above-described method.

Another aspect is an electronic system for the avoidance of one or more obstacles by an aircraft, e.g., a rotary-wing aircraft, the aircraft comprising a warning system capable of generating alerts as a function in particular of the proximity of the obstacle(s), the electronic avoidance system comprising a capability configured to determine a guidance rule to avoid an obstacle indicated by an alert generated by the warning system, the capability configured to determine a guidance rule comprising a capability configured to determine at least one speed and/or heading set-point, and a capability configured to compute the avoidance guidance rule as a function of the determined set-point(s).

The system further comprises an activation capability capable of:

(i) automatically—if no manual avoidance maneuver is detected for a time longer than a first determined time effective from issue of the alert by the warning system and if the alert is maintained throughout this first period of time—activating an automatic obstacle-avoidance guide mode to determine an obstacle-avoidance guidance rule by the determination capability;

(ii) if an autopilot device of the aircraft is coupled to the automatic avoidance guide mode, transmitting the computed avoidance guidance rule to the autopilot device for automatic performing of an obstacle avoidance maneuver by action on one and/or the other of two primary control members of the aircraft to cause the aircraft to reach the set-point(s), the warning system being capable of generating alert of at least a first and a second type, automatic activation only being implemented in the event that the alert generated by the warning system is an alert of second type.

According to one embodiment, the system further comprises a capability configured to control display on a display device of the aircraft visible by the crew, the capability being capable—if the autopilot device is not coupled to the automatic avoidance guide mode—of displaying the computed avoidance guidance rule on the display device, to provide the crew with assistance in carrying out a manual avoidance maneuver by action on one and/or the other of two primary control members of the aircraft so that the set-points are reached by the aircraft.

Another aspect is a rotary-wing aircraft comprising a warning system capable of generating alerts as a function in particular of the proximity of one or more obstacles, and an electronic system for avoidance of the obstacle(s) by the aircraft such as presented above.

The method and system of the described technology therefore initially leave initiative with the crew in the event of predictive alerts given by the warning system, for graduated response to such alerts.

As last resort, if the crew does not respond and if an autopilot device is coupled, an automatic avoidance maneuver is engaged on the basis of computed commands which, when applied to the aircraft, allow an avoidance maneuver adapted to the level of alert.

Optionally, if an autopilot device is not coupled, the computed commands are presented to the crew for manual performance of the maneuver.

The method and system of the described technology therefore offer the crew the following possibilities:

not to use assistance and to give another response; or to use assisted manual piloting for an avoidance maneuver adapted to the level of alert; or to use automatic guidance for an avoidance maneuver adapted to the level of alert, whilst guaranteeing that, in the event of no decision being taken by the crew, the computed avoidance maneuver is automatically engaged.

Safety is thereby improved with reduced workload for the crew and increased piloting comfort.

BRIEF DESCRIPTION OF THE DRAWINGS

The characteristics and advantages of the described technology will become apparent on reading the following description given solely as a non-limiting example with reference to the appended drawings in which.

DETAILED DESCRIPTION OF CERTAIN INVENTIVE EMBODIMENTS

Figure 1:
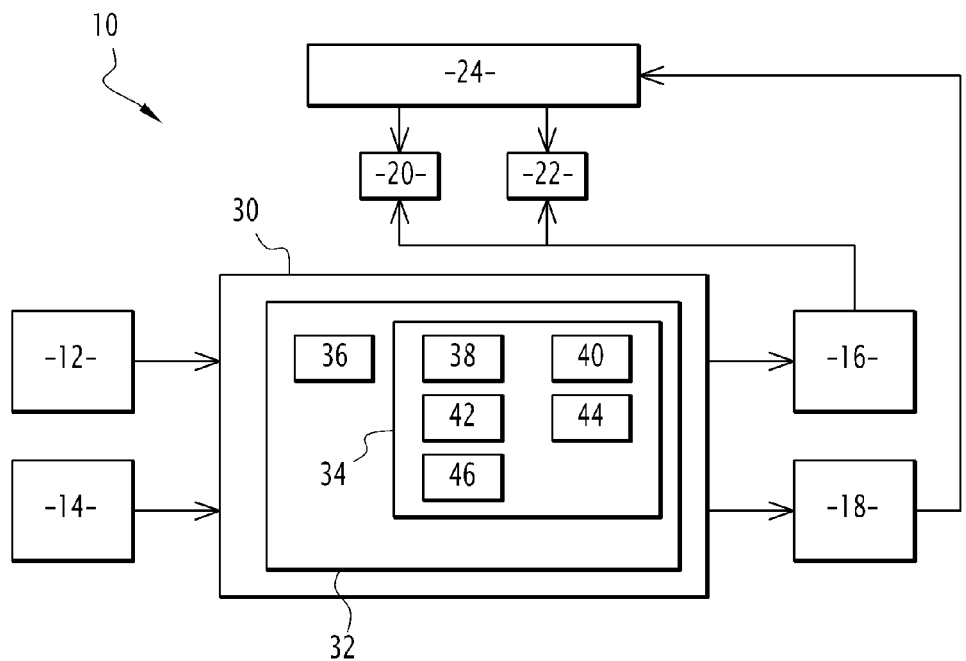
FIG. 1 schematically illustrates an aircraft of the described technology, the aircraft comprising a warning system capable of generating alerts—as a function in particular of proximity with one or more terrain obstacles—speed and acceleration measurement sensors, flight control members, an autopilot device, a data display device and an obstacle avoidance electronic system.

FIG. 1 schematically illustrates an aircraft 10 such as a rotary-wing aircraft comprising a warning system 12 capable of generating alerts as a function in particular of the proximity of one or more obstacles which may be terrain obstacles for example related to the relief of this terrain.

The aircraft 10 also comprises a set of sensors 14 capable of measuring data related to the aircraft 10 such as speeds and accelerations of the aircraft 10.

The aircraft 10 further comprises an autopilot device 16 and a data display device 18, e.g., a monitor screen 18.

In addition, the aircraft 10 comprises a first stick 20 and second stick 22 each forming a primary control member capable of being operated by the crew 24 of the aircraft 10 for piloting thereof.

According to the described technology, the aircraft 10 further comprises an electronic system 30 for avoidance by the aircraft 10 of one or more obstacles.

The warning system 12, e.g., a TAWS type system is known per se and is adapted to generate alerts in the event of aircraft closeness to terrain relief.

When an alert is issued by the warning system 12, this warning system 12 provides the electronic avoidance system 30 with data on the type of alert. This data may possibly be completed by data on flight constraints, data on current aircraft status and engine data which may originate from the warning system 12 itself of from another adapted system, from sensors 14.

The electronic avoidance system 30 is then capable of determining an obstacle-avoidance guidance rule by determining one or more speed and/or heading set-points, and computing the guidance rule as a function of these set-points.

The set of sensors 14 is adapted to measure speeds and accelerations of the aircraft 10, in particular a vertical speed VZ and vertical acceleration AZ in a vertical direction Z. i.e., a direction normal to the earth's surface or a direction substantially passing through the center of the globe. The measured vertical speed and measured vertical acceleration, respectively corresponding to the current vertical speed of the aircraft 10 and the current vertical acceleration of the aircraft 10 are respectively denoted VZ_mes and AZ_mes.

Persons skilled in the art will evidently understand that the described technology similarly applies to the case in which the flight path angle is used, denoted FPA, rather than the vertical speed VZ, bearing in mind that the changeover from one magnitude to another uses the following equation:

$$FPA = \tan\left(\frac{VZ}{VX}\right) \quad (1)$$

where VX represents a longitudinal speed in a longitudinal direction X perpendicular to the vertical direction Z.

The set of sensors 14 is also adapted to measure an indicated air speed or ground speed, the measured air speed or ground speed for the aircraft 10 corresponding to the current air or ground speed of the aircraft 10.

The indicated air speed is generally denoted IAS. By convention and for simplification, in the remainder of the description the acronym IAS will also be used for ground speed.

Similarly, the measured air speed is denoted IAS_mes, and this denotation will also be used to designate the measured ground speed.

Therefore in the remainder of the description, the air or ground speed will correspond by convention to the indicated air speed IAS.

Those skilled in the art will evidently understand that the described technology similarly applies to the case in which the measured air speed is the conventional air speed or true airspeed, or to MACH.

The air or ground speed IAS comprises a vertical component in the vertical direction Z and a longitudinal component in a longitudinal direction X perpendicular to the vertical direction Z.

The set of sensors 14 is also adapted to measure the longitudinal acceleration AX of the aircraft 10 in the longitudinal direction X, the measured longitudinal acceleration being denoted AX_measured.

The autopilot device 16 is known per se and when activated allows automatic action on the pathway of the aircraft 10 if none of the primary control members 20, 22 is operated by the aircraft crew 24.

In general, on a rotary-wing aircraft 10 the autopilot device 16 is always engaged ensuring basic stabilization.

Additionally, an automatic guide mode may also be present allowing the aircraft 10 to be guided in accordance with a determined guidance rule.

If such automatic guide mode exists, it is said that this automatic guide mode is coupled to the autopilot device 16 (or that the autopilot device 16 is coupled to the automatic guide mode) when this automatic guide mode is engaged, or activated, and transmits its commands to the autopilot device 16.

On the contrary, it is said that the automatic guide mode is not coupled to the autopilot device 16 (or that the autopilot device 16 is not coupled to the automatic guide mode) when this automatic guide mode is engaged, or activated, but does not transmit its commands to the autopilot device 16.

The display screen 18 is capable of displaying data, in particular data originating from the electronic avoidance system 30, to provide the aircraft crew 24 with assisted piloting.

In the example of embodiment in FIG. 1, the display screen 18 is separate from the electronic avoidance system 30. As a variant, not illustrated, the display screen 18 is integrated in the electronic avoidance system 30.

The first and second sticks 20, 22 are known per se and form primary members of the aircraft 10 which are manipulated by the crew 24 to pilot the aircraft.

The first stick 20, also called collective pitch lever, is adapted to control climbing and descent of the rotary-wing aircraft 10 in a vertical plane containing the vertical direction Z and the longitudinal direction X.

The second lever 22, also called cyclic stick or cyclic is adapted to control variation in pitch of the rotary-wing aircraft 10.

The electronic avoidance system 30 comprises a data processing unit 32 formed for example of a memory 34 and a processor 36 associated with the memory 34.

In the example of embodiment in FIG. 1, the electronic avoidance system 30 is separate both from the warning system 12 and from the autopilot device 16.

As a non-illustrated variant, the electronic avoidance system 30 is integrated in the autopilot device 16. The display screen 18 then corresponds to a display screen of the autopilot device 16 for example, not illustrated, and the data processing unit 32 corresponds to a data processing unit of the autopilot device 16, not illustrated.

The memory 34 is capable of storing acquisition software 38, storing data among data provided by the set of sensors 14, alert data from the warning system 12, and any set-points provided by the autopilot device 16.

The memory 34 is also capable of storing software 40 to determine one or more set-points of speed IAS_cons, VZ_cons and/or heading CAP_cons.

The memory 34 is also capable of storing software 42 to compute an obstacle-avoidance guidance rule, the computing of the guidance rule being performed as a function of the determined speed and/or heading set-point(s) IAS_cons, VZ_cons, CAP_cons.

In addition, the memory 34 is capable of storing software 44 to control the display on screen 18 of data related to the computed avoidance guidance rule.

Such data displayed on the screen 18, visible to the crew 24, provides assistance enabling the crew 24 to perform a manual avoidance maneuver by acting on one and/or the other of the two primary control members 20, 22 of the aircraft 10. The purpose of such action is to cause the aircraft 10 to reach the determined set-point(s) IAS_cons, VZ_cons, CAP_cons.

Also, the memory 34 is capable of storing software 46 to activate an automatic avoidance guide mode by transmitting data to the autopilot device 16 relating to the computed avoidance guidance rule, to allow automatic performing of the avoidance maneuver by the autopilot device 16.

In this case, the autopilot device 16 acts automatically on one and/or the other of the two primary control members 20, 22 of the aircraft 10, such action intended to cause the aircraft 10 to reach the determined set-point(s) IAS_cons, VZ_cons, CAP_cons.

For example, the data transmitted to the autopilot device 16 comprises an attitude variation command D_THETA_com, a collective pitch lever variation command D_COLL_com, a roll attitude variation command or an angular rate of yaw command D_PSI_com.

The processor 36 is able to load and execute each of the software programs 38, 40, 42, 44 and 46.

The acquisition software 38, the software 40 to determine one or more speed and/or heading set-points and the software 42 to compute an obstacle-avoidance guidance rule respectively form data acquisition unit 38, unit 40 to determine one or more speed and/or heading set-points and unit 42 to compute an obstacle-avoidance guidance rule.

The unit 40 to determine one or more speed and/or heading set-points and the unit 42 to compute an obstacle-avoidance guidance rule more generally form an obstacle-avoidance guidance rule determinator.

As a variant, the acquisition unit 38, the determination unit 40 and the computing unit 42 are in the form of programmable logic components or in the form of dedicated integrated circuits.

The display control software 44, or display controller, and the activation software 46 or activator respectively form unit 44 to control data display on the screen 18 and unit 46 to activate the automatic avoidance guide mode to determine an avoidance guidance rule and to transmit data on the determined guidance rule to the autopilot device 16.

As a variant, the display controller 44 and activator 46 are in the form of programmable logic components or in the form of dedicated integrated circuits.

The acquisition software 38 is adapted for example to acquire both measured vertical speed and air values VZ_mes, IAS_mes and measured vertical and longitudinal acceleration values AZ_mes, AX_mes.

The determination software 40 is adapted, for example, to compute a vertical speed set-point VZ_cons, an air speed set-point IAS_cons and heading set-point CAP_cons. The vertical speed set-point VZ_cons only comprises a vertical component in the vertical direction Z, and the air speed set-point IAS_cons comprises both a vertical component in the vertical direction Z and a longitudinal component in the longitudinal direction X.

In the described example of embodiment, each speed set-point VZ_cons, IAS_cons, and heading set-point CAP_cons comprises a target value, the avoidance guidance rule being computed as a function of the current value and target value, so that the current value converges towards the target value following a convergence rule.

The activation software 46 is capable of changing the aircraft 10 over to automatic obstacle-avoidance guide mode should no manual avoidance maneuver by the crew 24 be detected for a time longer than a first determined time T effective from issue of an alert by the warning system 12, and if this alert is maintained during the first determined time T.

In one variant, the alerts generated by the warning system 12 can be of different type. For example they may be predictive alerts of a first type: CAUTION, predictive alerts of a second type: WARNING, even predictive alerts of a third type: AVOID.

In this variant, the activation software 46 causes the aircraft 10 to change over to automatic obstacle-avoidance guidance mode in the event that no manual avoidance maneuver by the crew 24 is detected for a time longer than a first determined time T effective from issue of an alert by the warning system 12, if this alert is maintained during time T and only if the alert under consideration is an alert of second type: WARNING.

Optionally, an additional condition may be required which is that the alert under consideration of the second type: WARNING must have been preceded by generation by the warning system 12 of an alert of first type: CAUTION.

Activation of the automatic guide mode which can be obtained by the activation software 46 as explained above, may also be obtained by manual activating action by the crew 24.

The computing software 42 is adapted to compute the guidance rule for avoidance of one or more obstacles as a function of the determined speed and/or heading set-points, for example as a function of the vertical speed set-point VZ_cons, air speed set-point IAS_cons and heading set-point CAP_cons.

The guidance rule computed by the computing software 42 comprises three commands for example, namely a first command being a function of the air speed set-point IAS_cons and measured air speed IAS_mes, a second command being a function of the vertical speed set-point VZ_cons and measured vertical speed VZ_mes, and a third command being a function of the heading set-point CAP_cons and measured heading CAP_mes (corresponding to the current heading of the aircraft 10).

In addition the computed guidance rule is also a function first of vertical acceleration AZ, and secondly of longitudinal acceleration AX. The first command is then a function of the air speed set-point IAS_cons, of measured air speed IAS_mes and of longitudinal acceleration AX. Similarly the second command is a function of the vertical speed set-point VZ_cons, of measured vertical speed VZ_mes and of vertical acceleration AZ.

In the described example of embodiment wherein the aircraft 10 is a rotary-wing aircraft, the first command is the attitude variation command D_THETA_com, the second command is the collective pitch lever variation command D_COLL_com, and the third command is the roll attitude variation command or angular rate of yaw command D_PSI_com.

The attitude variation command D_THETA_com verifies the following equation for example:

$$D\_THETA\_com = -K1 \times (IAS\_cons - IAS\_mes) + K2 \times AX\_mes \qquad (2)$$

where IAS_cons is the air speed set-point,
IAS_mes is measured air speed,

AX_mes is measured longitudinal acceleration, and

K1 and K2 are gains at least dependent on altitude and speed.

Gain K1 is expressed in degrees per $m \cdot s^{-1}$, and is between 1 degree per $m \cdot s^{-1}$ and 6 degrees per $m \cdot s^{-1}$ for example, typically it is 3 degrees per $m \cdot s^{-1}$.

Gain K2 is expressed in degrees per $m \cdot s^{-2}$, and is between 0 degree per $m \cdot s^{-2}$ and 12 degrees per $m \cdot s^{-2}$ for example, typically it is 6 degrees per $m \cdot s^{-2}$.

The collective pitch lever variation command D_COLL_com verifies the following equation for example:

$$D\_COLL\_com = K3 \times (VZ\_cons - VZ\_mes) - K4 \times AZ\_mes \quad (3)$$

where VZ_cons is the vertical speed set-point,

VZ_mes is measured vertical speed,

AZ_mes is measured vertical acceleration, and

K3 and K4 are gains at least dependent on altitude and speed.

Gain K3 is expressed in % per $m \cdot s^{-1}$, and is between 1% per $m \cdot s^{-1}$ and 4% per $m \cdot s^{-1}$, for example, typically it is 2% per $m \cdot s^{-1}$.

Gain K4 is expressed in % per $m \cdot s^{-2}$, and is between 0% $m \cdot s^{-2}$ and 4% per $m \cdot s^{-2}$, for example, typically it is 1% per $m \cdot s^{-2}$.

The roll attitude variation command or angular rate of yaw command D_PSI_com verifies the following equation for example:

$$D\_PSI\_com = K5 \times (CAP\_cons - CAP\_mes) \quad (4)$$

where CAP_cons is the heading set-point,

CAP_mes is a current or measured heading,

K5 is a gain at least dependent on altitude and speed, expressed in degrees of roll attitude per heading degree (for a roll attitude variation command) and is between 0.1 and 3, for example, typically it is 1.5.

The functioning of the electronic avoidance system 30 of the described technology will now be described with reference to FIG. 3 giving a flow chart of the avoidance method of the described technology.

At an initial step 100, values of vertical and air speeds VZ_mes, IAS_mes are measured by the set of sensors 14, then acquired by the acquisition software 38. The acquisition software 38 also acquires current heading data CAP_mes, and data on alerts transmitted by the warning system 12.

In addition, values of vertical and longitudinal accelerations AZ_mes, AX_mes are measured by the set of sensors 14, the acquired by the acquisition software 38.

These different speed and acceleration values are preferably measured at one same instant of time. The determination software 40 at step 110 then determines the vertical speed set-point VZ_cons, air speed set-point IAS_cons, and heading set-point CAP_cons, in particular using the previously acquired, measured vertical speed, air speed and heading values VZ_mes, IAS_mes, CAP_mes.

For this purpose the current speed values IAS_mes and VZ_mes are compared with the corresponding reference speed values IAS_ref and VZ_ref, and the determination of the corresponding set-point IAS_cons and VZ_cons is dependent on the result of comparison.

For example, to determine the air speed set-point IAS_cons, the reference air speed IAS_ref may be the air speed of best rate of climb Vy.

Figure 2:
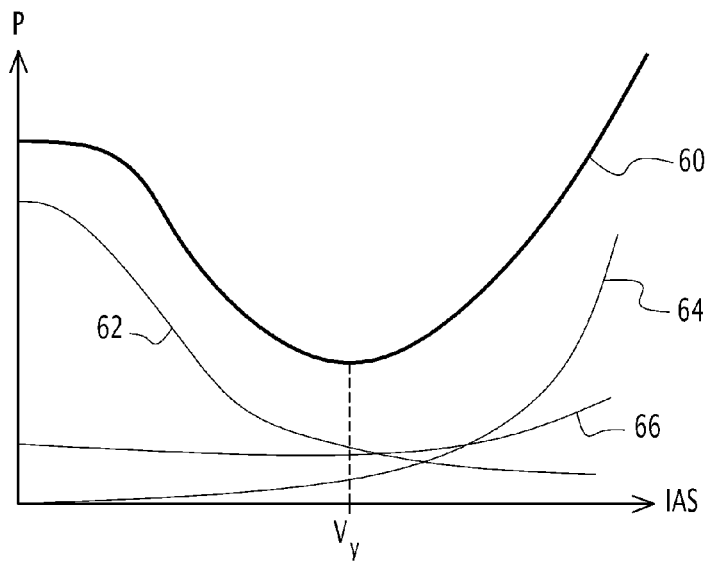
FIG. 2 is a set of curves representing different aircraft powers, and the total required flight power for the aircraft.

This best climb air speed Vy, which can be seen in FIG. 2, is the air speed corresponding to a minimum value of total power required to fly the aircraft 10, the total required power corresponding to the bold line curve 60 in FIG. 2. In FIG. 2, curve 62 represents the induced power used to lift the aircraft 10, curve 64 represents the parasite power resulting from aerodynamic effects of relative wind on the aircraft 10 and curve 66 represents the profile power resulting from drag forces on the rotor blades, the total required power being the sum of induced power, parasite power and profile power.

If the air speed set-point IAS_cons is lower than the best rate of climb Vy, the value of the measured air speed IAS_mes is chosen to be the new air speed set-point IAS_cons. Otherwise, the value of the best rate of climb Vy is chosen to be the new air speed set-point IAS_cons.

When determining the vertical speed set-point VZ_cons, the reference vertical speed VZ_ref may be a function of the type of alert: CAUTION, WARNING, etc. . . . . For example, when so justified by the level of alert, the reference vertical speed VZ_ref may correspond to the maximum power vertical climb speed, hence to the speed obtained at the maximum allowable position of the collective pitch lever 20.

If the measured vertical speed VZ_mes is higher than the reference vertical speed VZ_ref, the value of the reference vertical speed is chosen to be the new vertical speed set-point VZ_cons. If not, the measured vertical speed value VZ_mes is chosen to be the new vertical speed set-point VZ_cons.

It is also possible to provide for verification of the compatibility of the vertical speed set-point VZ_cons thus determined with a minimum flight path angle FPA_min which is a function of the characteristics of the aircraft 10 in particular.

Therefore, if the determined vertical speed set-point VZ_cons is not compatible with this minimum flight path angle FPA_min, a new vertical speed set-point VZ_cons is calculated which is compatible with the minimum flight path angle FPA_min.

If there is no minimum flight path angle, it is considered that the vertical speed set-point is compatible by default.

The computing of a new vertical speed set-point VZ_cons compatible with the minimum flight path angle FPA_min may lead to selecting as new vertical speed set-point VZ_cons the vertical speed the closest to the current value or measured value of vertical speed VZ_mes, which is FPA-min compatible.

When determining the heading set-point CAP_cons, the current heading value CAP_mes of the aircraft 10 is measured, and its compatibility is verified with any heading constraint.

If the current heading value CAP_mes is not compatible with this heading constraint, anew heading set-point CAP_cons compatible with this constraint is computed. Otherwise the current heading value CAP_mes is used as new heading set-point CAP_cons.

Figure 3:
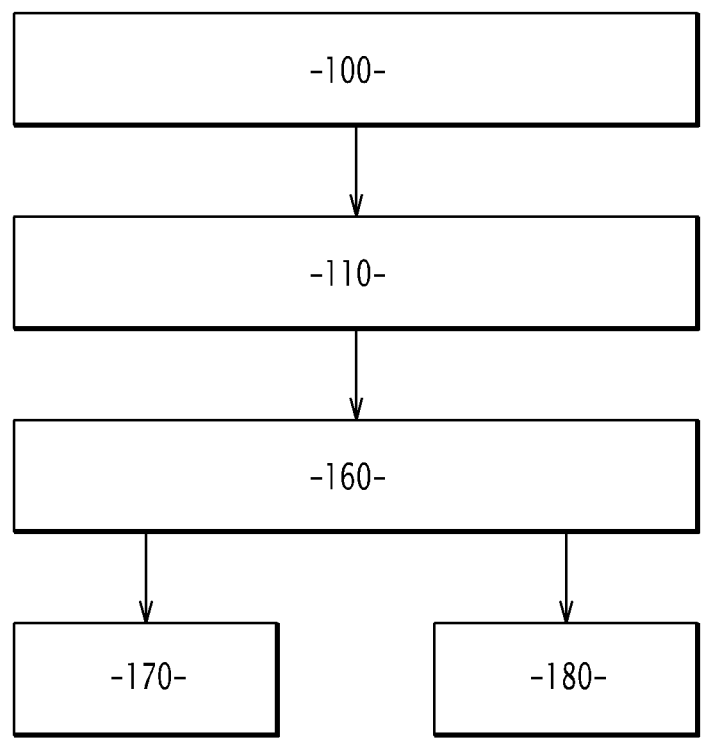
FIG. 3 is a flow chart of a method according to the described technology for the avoidance of one or more obstacles, the method being implemented by the avoidance system in FIG. 1.

The computing software 42, seen in FIG. 3, then computes the obstacle-avoidance guidance rule at step 160 as a function of the determined speed and heading set-point(s). In the described example of embodiment, the computing software 42 computes the attitude variation command D_THETA_com as a function of the value of the air speed set-point IAS_cons, of measured air speed IAS_mes and of measured longitudinal acceleration AX_mes following equation (2). The computing software 42 also computes the collective pitch lever variation command D_COLL_com as a function of the value of the vertical speed set-point VZ_cons, of measured vertical speed VZ_mes and of measured vertical acceleration AZ_mes following equation (4). Finally, the computing software 42 computes the roll attitude variation command or angular rate of yaw command DPSI_com as a function of the heading set-point value CAP_cons and of the measured heading value CAP_mes following equation (5).

After step 160, and if the autopilot device 16 is coupled to the automatic avoidance guide mode, the electronic avoidance system 30 at step 180 transmits data via the transmission software 46 relating to the computed avoidance guidance rule to the autopilot device 16 so that the avoidance maneuver is automatically carried out by the autopilot device 16. In particular, the transmission software 46 transmits the command values of attitude variation D_THETA_com, collective pitch lever D_COLL_com and roll attitude variation or angular rate of yaw D_PSI_com, previously computed at step 160.

Optionally, if the autopilot device 16 is not coupled to the automatic avoidance guide mode, the electronic avoidance system 30 moves to step 170 at which its display software 44 manages display on the screen 18 of data related to the computed avoidance guidance rule to allow manual performing by the crew 24 of the computed avoidance maneuver.

Also, after step 160 the electronic avoidance system 30 returns to step 100 to acquire new data via its acquisition software 38.

After returning to step 100, the electronic avoidance system 30 moves to step 110 to determine new set-points.

The respective target values VZ_cons, IAS_cons and CAP_cons are preferably modified only if there is a change in acquired data. In other words, the respective target values are modified only if the avoidance maneuver must be changed e.g. further to a new obstacle or following after the end of an obstacle.

White there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method of avoidance of one or more obstacles by an aircraft, the aircraft comprising a warning system capable of generating alerts as a function of the proximity of the obstacle(s), and an electronic avoidance system, the method being implemented by the electronic avoidance system, the method comprising:
   a) generating an alert by the warning system on detection of an obstacle;
   b) if no manual avoidance maneuver is detected for a time period longer than a first determined time period effective from issue of the alert by the warning system and if the alert is maintained during this first time period, automatically activating an automatic avoidance guide mode to determine an obstacle-avoidance guidance rule, the determination of the guidance rule comprising the determination of at least one speed and/or heading set-point and the computing of the avoidance guidance rule as a function of the determined set-point(s); and
   c) if an autopilot device of the aircraft is coupled to the automatic avoidance guide mode, transmitting to the autopilot device the avoidance guidance rule determined in step b) for automatic performing of a maneuver to avoid the obstacle by acting on at least one of two primary control members of the aircraft causing the aircraft to reach the set-point(s), the warning system being capable of generating alerts of at least a first and second type, step b) only being implemented in the event that the alert generated by the warning system is an alert of the second type.

2. The method according to claim 1, wherein if the autopilot device is not coupled to the automatic avoidance guide mode, the method further comprises the display of the avoidance guidance rule determined in step b) on a display device of the aircraft visible to the crew, to provide the crew with assistance to carry out a manual avoidance maneuver by acting on at least one of the two primary control members of the aircraft causing the aircraft to reach the set-point(s).

3. The method according to claim 1, wherein step b) is only implemented in the event that the alert of the second type generated by the warning system is preceded by the generation of an alert of the first type by the warning system.

4. The method according to claim 1, wherein the activation of the automatic avoidance guide mode in step b) can be performed manually by the crew.

5. The method according to claim 1, wherein the avoidance guidance rule, for at least one of the set-points, comprises a convergence rule whereby a current value must converge towards the corresponding set-point.

6. The method according to claim 1, wherein the determination of the guidance rule comprises measurement of the current value of the speed of the aircraft on which it is sought to act, and wherein the determination of the set-point comprises the comparison of the current value(s) with one or more corresponding reference values and determination of the set-point(s) as a function of this comparison.

7. The method according to claim 6, wherein one of the determined set-points is an air speed or ground speed set-point comprising a longitudinal component perpendicular to a vertical axis, and the determination comprises comparing the current air or ground speed of the aircraft with the best climb rate and selecting the current air or ground speed as air or ground speed set-point if the current air or ground speed is lower than the best climb rate, and if not selecting the best climb rate.

8. The method according to claim 6, wherein one of the determined set-points is a vertical speed set-point comprising a vertical component, and the determination comprises comparing the current vertical speed of the aircraft with a reference vertical speed value as a function of the type of alert, and selecting the reference vertical speed as vertical speed set-point if the current vertical speed is lower than the reference vertical speed, and if not selecting the current vertical speed.

9. The method according to claim 8, wherein the determination comprises verification of the compatibility of the determined vertical speed set-point with a minimum flight path angle that is a function of the aircraft in particular, and the computing of a new vertical speed set-point compatible with the minimum flight path angle if the determined vertical speed set-point is not compatible with this minimum flight path angle.

10. The method according to claim 1, wherein one of the determined set-points is a heading set-point, wherein the determination of the guidance rule comprises measurement of the current heading value of the aircraft on which it is sought to act, and wherein the determination of the set-point comprises verification of the compatibility of the current heading value with a heading constraint, and the computing of a new heading set-point compatible with the heading constraint if the current value is not compatible with this heading constraint, otherwise the selecting of the current value as heading set-point.

11. A non-transitory computer program product comprising software instructions which, when executed on a computer, cause the computer to:
 a) generate an alert by the warning system on detection of an obstacle;
 b) if no manual avoidance maneuver is detected for a time period longer than a first determined time period effective from issue of the alert by the warning system and if the alert is maintained during this first time period, automatically activate an automatic avoidance guide mode to determine an obstacle-avoidance guidance rule, the determination of the guidance rule comprising the determination of at least one speed and/or heading set-point and the computing of the avoidance guidance rule as a function of the determined set-point(s); and
 c) if an autopilot device of the aircraft is coupled to the automatic avoidance guide mode, transmit to the autopilot device the avoidance guidance rule determined in step b) for automatic performing of a maneuver to avoid the obstacle by acting on at least one of two primary control members of the aircraft causing the aircraft to reach the set-point(s), the warning system being capable of generating alerts of at least a first and second type, step b) only being implemented in the event that the alert generated by the warning system is an alert of the second type.

12. An electronic avoidance system of one or more obstacles by an aircraft comprising a warning system capable of generating alerts as a function in particular of the proximity of the one or more obstacles, the electronic avoidance system comprising a memory having stored thereon software configured to cause a processor to determine a guidance rule for avoidance of an obstacle indicated by an alert generated by the warning system, to determine at least one speed and/or heading set-point, and to compute the avoidance guidance rule as a function of the determined set-point(s),
 the electronic avoidance system further comprising an activator configured to:
 (i) automatically—if no manual avoidance maneuver is detected for a time period longer than a first determined time period effective from issue of the alert by the warning system and if the alert is maintained during this first time period—activate an automatic obstacle-avoidance guide mode for determination of an obstacle-avoidance guidance rule by the determination units;
 (ii) transmit the computed avoidance guidance rule to the autopilot—if an autopilot device of the aircraft is coupled to the automatic avoidance guide mode—for automatic performing of an avoidance maneuver of the obstacle by acting on at least one of two primary control members of the aircraft, to cause the aircraft to reach the set-point(s),
 the warning system being configured to generate alerts of at least a first and second type, automatic activation only being implemented in the event that the alert generated by the warning system is an alert of the second type.

13. The system according to claim 12, further comprising a controller configured to control display on a display device of the aircraft visible by the crew which, if the autopilot device is not coupled to the automatic avoidance guide mode, displays on the display device the computed avoidance guidance rule to provide the crew with assistance to carry out a manual avoidance maneuver by acting on at least one of the two primary control members of the aircraft, to cause the aircraft to reach the set-point(s).

14. An aircraft comprising:
 a warning system capable of generating alerts as a function in particular of the proximity of one or more obstacles; and
 an electronic system for avoidance by the aircraft of the one or more obstacles, comprising an avoidance system, the avoidance system comprising:
 a memory having stored thereon software configured to cause a processor to: i) determine a guidance rule for avoidance of an obstacle indicated by an alert generated by the warning system, ii) determine at least one speed and/or heading set-point, and iii) compute the avoidance guidance rule as a function of the determined set-point(s); and
 an activator configured to:
 (i) automatically—if no manual avoidance maneuver is detected for a time period longer than a first determined time period effective from issue of the alert by the warning system and if the alert is maintained during this first time period—activate an automatic obstacle-avoidance guide mode for determination of an obstacle-avoidance guidance rule by the determination units;
 (ii) transmit the computed avoidance guidance rule to the autopilot—if an autopilot device of the aircraft is coupled to the automatic avoidance guide mode—for automatic performing of an avoidance maneuver of the obstacle by acting on at least one of two primary control members of the aircraft, to cause the aircraft to reach the set-point(s),
 the warning system being configured to generate alerts of at least a first and second type, automatic activation only being implemented in the event that the alert generated by the warning system is an alert of the second type.

15. A method of avoidance of one or more terrain obstacles by a rotary-wing aircraft, comprising a warning system capable of generating alerts as a function of the proximity of the terrain obstacle(s), and an electronic avoidance system, the method being implemented by the electronic avoidance system, the method comprising:
 a) generating an alert by the warning system on detection of a terrain obstacle;
 b) if no manual avoidance maneuver is detected for a time period longer than a first determined time period effective from issue of the alert by the warning system and if the alert is maintained during this first time period, automatically activating an automatic avoidance guide mode to determine an obstacle-avoidance guidance rule, the determination of the guidance rule comprising the determination of at least one speed and/or heading set-point and the computing of the avoidance guidance rule as a function of the determined set-point(s); and
 c) if an autopilot device of the rotary-wing aircraft is coupled to the automatic avoidance guide mode, transmitting to the autopilot device the avoidance guidance rule determined at step b) for automatic performing of a maneuver to avoid the terrain obstacle by acting on at least one of two primary control members of the rotary-wing aircraft causing the rotary-wing aircraft to reach the set-point(s), the warning system being capable of generating alerts of at least a first and second type, step b) only being implemented in the event that the alert generated by the warning system is an alert of the second type.

* * * * *